United States Patent [19]

Andersson et al.

[11] 4,432,825
[45] Feb. 21, 1984

[54] METHOD OF MAKING FOAM COMPOSITE MATERIAL IMPREGNATED WITH RESIN

[75] Inventors: Bengt Andersson, Söraker; Olof Tanner, Sundsvall, both of Sweden

[73] Assignee: Kemanord AB, Stockholm, Sweden

[21] Appl. No.: 417,599

[22] Filed: Sep. 13, 1982

Related U.S. Application Data

[62] Division of Ser. No. 260,677, May 5, 1981, Pat. No. 4,362,778.

[30] Foreign Application Priority Data

May 21, 1980 [SE] Sweden .............................. 8003776

[51] Int. Cl.³ ............................................. B32B 31/00
[52] U.S. Cl. .............................. 156/307.3; 427/372.2; 427/430.1
[58] Field of Search .......................... 156/307.3, 307.1; 427/430.1, 372.2

[56] References Cited

U.S. PATENT DOCUMENTS 3,391,049  7/1968  Manwaring ..................... 428/304.4
3,864,181  2/1975  Wolinski et al. ................. 428/317.7
4,046,937  9/1977  McCaskey, Jr. et al. ......... 428/278

*Primary Examiner*—William J. Van Balen
*Attorney, Agent, or Firm*—Fred Philpitt

[57] ABSTRACT

The invention relates to a foam composite material which comprises a material in web form impregnated with a curable resin. The resin in the foam composite material is in the B-stage. The foam composite material further contains expanded thermoplastic particles which are essentially uniformly distributed in the resin and in the web material. The invention also relates to the use of this foam composite material as a means for surface modifying wood-based substrates, which preferably are uneven, e.g. plywood.

7 Claims, No Drawings

METHOD OF MAKING FOAM COMPOSITE MATERIAL IMPREGNATED WITH RESIN

This is a division of application Ser. No. 260,677, filed May 5, 1981, now U.S. Pat. No. 4,362,778 and the benefits of 35 USC 120 are claimed relative to it.

The present invention concerns a foam composite material which is impregnated with resin. Specifically, the invention concerns a foam composite material comprising a web, which is impregnated with a thermosetting resin and which contains expanded thermoplastic particles. The foam composite material according to the invention is preferably used for modifying surfaces.

The foam composite material may for instance be prepared in the following way. A pre-condensate of a water based thermosetting resin is prepared conventionally and the amount of water is adjusted in order to obtain 30 to 75 percent by weight dry substance. To the solution obtained is added non-expanded thermoplastic particles, known as microspheres, in an amount such that the weight ratio microspheres:resin varies between 4:1 and 1:50 in the finished foam composite material. In expanded condition, the microspheres preferably constitute 70-95, specifically 85-95, percent by volume of the foam composite material. A material in the form of a web is impregnated with the mixture of resin and microspheres in a conventional way, e.g. by immersing the web in a bath of the mixture or by spraying the mixture on the web. The impregnated web, the degree of impregnation of which can be adjusted e.g. by rolls, is then treated thermally, suitably with circulating hot air having a temperature of 80-150° C. so that the resin sets to the B-stage and the microspheres expand. It should be noted in this context that a thermosetting resin in the A-stage is meltable, poorly cross-linked and soluble in acetone and other solvents. A C-stage resin is not meltable, completely cross-linked and insoluble. The B-stage is a stage between the A-stage and the C-stage.

Thermosetting resins that may be used according to the present invention are resins based on formaldehyde with urea, phenol, resorcinol or melamine.

The web material may consist of woven or nonwoven organic or inorganic material and specifically glass fibre, mineral fibre, cellulose fibre and polyester may be mentioned. It is also important that the web material has sufficient porosity so that it can be impregnated with the mixture of resin and microspheres in a satisfying manner. Further, the web material must not be too thick and suitably the thickness may vary between 0.1 and 5 mm. The reason why the web material must be thin is that otherwise there may be a non-uniform expansion of microspheres owing to the fact that, at the thermal treatment, superficially situated microspheres expand first and these expanded microspheres form a thermally, insulating layer preventing those microspheres which are situated more deeply or more central from expanding and if this happens a product of inferior quality, which is not homogenous, will be obtained.

The microspheres which are used when preparing the foam composite material according to the present invention have shells which may be made up of copolymers of vinyl chloride and vinylidene chloride, copolymers of vinylidene chloride and acrylonitrile, copolymers of vinyl chloride and acrylonitrile and copolymers of styrene and acrylonitrile. Further, copolymers of methyl metacrylate containing up to 20 percent by weight styrene, copolymers of methyl metacrylate and up to 50 percent by weight of combined monomers of ethyl metacrylate, copolymers of methyl metacrylate and up to about 70 percent by weight of ortochlorostyrene may be mentioned. The particle size of the non-expanded particles and, accordingly, the expanded particles may vary within broad limits and is selected with respect to the properties desired for the finished product. Examples of particle sizes for the non-expanded spheres are 1 $\mu$m to 1 mm, preferably 2 $\mu$m to 0.5 mm and specifically 5 $\mu$m to 50 $\mu$m. At the expansion the diameter of the microspheres increases by a factor 2–5. The non-expanded microspheres contain volatile, liquid blowing agents which are vaporized at the application of heat. The blowing agents may consist of freones, hydrocarbons, such as n-pentane, isopentane, neopentane, butane, isobutane or other blowing agents, that are used conventionally in microspheres of the type specified above. Suitably 5–30 percent by weight of the microspheres may consist of blowing agent. The microspheres may be added to the resin solution in the form of dried particles or in the form of a suspension, for instance in an alcohol such as methanol.

As mentioned previously, the ratio resin to microspheres in the impregnating solution may vary within broad limits and this ratio affects the properties of the final product. Correspondingly, starting from certain fields of employment and certain desired properties of the final product it is also possible to select a suitable ratio resin to microspheres in the mixture. This ratio can easily be determined by preparatory experiments in the laboratory.

Different additives such as stabilizers, coupliing agents, fillers, flame retarding agents and/or pigments may be added to the mixture of resin and the microspheres if desired or required.

The foam composite materials according to the invention may be used in combination with substrates or supporting layers, preferably wood based supporting layers, for preparing laminates and these laminates are called heterogenous laminates in the following text. It is also possible to laminate several layers of the foam composite material according to the invention for the preparation of multilaminates and these laminates will be called homogenous laminates in the following text.

In the preparation of the heterogenous laminates the foam composite material according to the invention is combined with an optional supporting layer and the combination of the foam composite material and the supporting layer is compressed at an elevated temperature. In this process time, temperature and pressure are chosen mainly with consideration taken to the type of resin used. Often the time for the pressing may vary between 20 seconds and 20 minutes. The temperature may vary between 100° and 180° C. and the pressure between 0.1 and 3 MPa. If the supporting layer has a rough and uneven surface especially attractive effects may be attained by the foam composite material penetrating the cavities and filling these up, while the "free" surface of the foam composite material, i.e. the surface that is facing the press plate, becomes completely smooth, as the microspheres adjacent to the press plate collapses by the pressure while expanded microspheres adjacent the rough surface of the supporting layer penetrates into the cavities filling these up. Accordingly, a levelling out of the surface is effected. In practice this effect of levelling out can be achieved for example in connection with the preparation of plywood. In conventional plywood preparation sized veneers are prepared first and the veneers are compacted to plywood. In order to get a satisfying surface the rough surface is then ground and a surface coating is then pressed onto the plywood surface. Using the foam composite material according to the present invention it is possible to press together several veneer sheets and a thin sheet of a foam composite material in one single step and, after pressing, there is obtained a hard, completely smooth surface layer consisting of a foam composite material according to the invention, in which material the resin is completely cured and the microspheres have collapsed partly. Other properties which can be obtained in heterogenous laminates containing a foam composite material according to the invention are improved flame retarding properties. It is possible to get a laminate surface suitable for painting and (wall) paper covering, to get a higher flexural modulus and a surface that is water repellant and thermal insulating. In sheet material a decrease of the skew of the plate, may be achieved.

The homogenous laminates are prepared with pressure times varying between 1 minute and 30 minutes. The pressure may suitably vary between 0.01 and 0.5 MPa and the temperatures between 100° and 150° C. Preferably such conditions are chosen that the expanded microspheres do not collapse. A light weight and strong material which for example may be used in the building trade is obtained if the microspheres do not collapse. Furthermore, it should be noted that the layer can be laminated by glueing without the application of heat.

The invention will be illustrated more in detail in the following non limiting examples.

EXAMPLE 1

A 50 g/m$^2$ felt of glass fibre was impregnated with a dispersion of VDC/ACN microspheres from Kema-Nord AB and a phenol resin solution 9916 from AB Casco having dry substances of 60 %, wherein the ratio of the dry substances MS:PF is 2:1 (VDC=vinylidene chloride, ACN=acrylonitrile, MS=microspheres, PF=phenol formadelhyde resin).

When the felt has been immersed in the impregnating bath excessive dispersion is pressed away by rolls. Then the felt is treated with air (120° C.) causing the water to leave until 7 percent by weight remain and simultaneously the microspheres expand. A homogenous laminate was prepared by superimposing four layers and pressing at 0.25 MPa, 125° C. for 10 minutes.

The following product was obtained:

| | |
|---|---|
| Thickness | 7.10 mm |
| Density | 162 kg m$^{-3}$ |
| Flexural modulus | 248 N/mm$^2$ |
| Flexural strength | 4.68 N/mm$^2$ |
| E modulus pressure | 15.66 N/mm$^2$ |
| Compression strength, 10% deformation | 0.78 N/mm$^2$ |
| Smoke | 2.8% KemaNord PM 227 Smoke development according to Arapahoe |
| Oxygen index | 45 ASTM 2863 |

This product can preferably be used as a core or surface material in sandwich structures. The homogenous laminate can be moulded at a temperature of about 120° C.

EXAMPLE 2

The process according to example 1 was repeated but the ratio MS:PF was 1:1 (calculated on the dry substances).

The following product was obtained:

| | |
|---|---|
| Thickness | 4.09 mm |
| Density | 264 kg m$^{-3}$ |
| Flexural modulus | 574 N/mm$^2$ |
| Flexural strength | 12.22 N/mm$^2$ |
| E modulus pressure | 31.11 N/mm$^2$ |
| Compression strength, 10% deformation | 1.89 N/mm$^2$ |
| Smoke | 2.4% KemaNord PM 227 Smoke development according to Arapahoe |
| Oxygen index | 45 ASTM 2863 |

This product can be used in sandwich structures.

EXAMPLE 3

The process according to example 1 was repeated but the ratio MS:PF was 1:2 (calculated on the dry substances).

The following product was obtained:

| | |
|---|---|
| Thickness | 3.1 mm |
| Density | 306 kg/m$^{-3}$ |
| Flexural modulus | 799 N/mm$^2$ |
| Flexural strength | 20.16 N/mm$^2$ |
| E modulus pressure | 40.19 N/mm$^2$ |
| Compression strength, 10% deformation | 3.85 N/mm$^2$ |
| Smoke | 1.8% KemaNord PM 227 Smoke development according to Arapahoe |
| Oxygen index | 42 ASTM 2863 |
| Flame-proof surface layer class 3 NT 004 | |
| Average smoke density | 9% |

The product can be used in sandwich structures.

EXAMPLE 4

A foam fibre layer was prepared according to example 1 but the ratio MS:PF was 1:2, calculated on the dry substance. This sheet was pressed onto a plasterboard at a pressure of 0.4 MPa and a temperature of 120° C. for 10 minutes, and a decorative surface suitable for embossing was obtained. At fire testing NT 004 class 1 is obtained on the surface and no smoke is developed.

EXAMPLE 5

Example 4 was repeated but a 10 mm unground spruce plywood was used as a supporting layer.

A levelling out of the surface was obtained and the surface was waterproof and suitable for painting and covering with wall paper.

The surface can further be decorative and suitable for embossing. The products have improved stiffness and are as far as fire is concerned classified as flame-proof surface layer class 3, average smoke density 13 %.

We claim:
1. A method for the manufacture of a laminate comprising the steps of:
   (a) providing a foam composite material including,
      (1) a material in the form of a web,

(2) a curable resin in the B-stage, i.e. in a stage between an uncured A-stage in which the resin is meltable, poorly cross-linked and soluble in solvents, and a C-stage in which the resin is not meltable, completely cross-linked and insoluble, and (3) expanded thermoplastic microspheres, wherein the curable resin and the microspheres are uniformly distributed in the web material, (b) assembling the foam composite material with at least one further such material or another material and (c) joining the materials by a transition from B-stage to C-stage of the curable resin.

2. The method of claim 1 characterized in that the final curing of the resin takes place under the influence of heat and pressure.

3. The method of claim 1 characterized in that the foam composite material is prepared by impregnation of the web material with expandable thermoplastic particles and a solution of the resin and heat is then added to expand the thermoplastic particles and to transform the resin into the B-stage.

4. A method for the manufacture of a foam composite material comprising the steps of:
(a) impregnating a porous web material homogeneously with thermoplastic microspheres and a curable resin in the A-stage, i.e. in which the resin is meltable, poorly cross-linked and soluble in solvents,
(b) heating the so treated web material for a time and at a temperature sufficient to cure the resin into the B-stage i.e. a stage between the A-stage and the C-stage in which the resin is not meltable, completely cross-linked and insoluble, and
(c) drying the web material, whereby a foam composite material containing expanded thermoplastic microspheres and curable resin in the B-stage is obtained.

5. The method of claim 4 in which the resin and the unexpanded microspheres are mixed before impregnation of the web material.

6. The method of claim 4 in which the impregnation takes place simultaneously with the formation of the web material from discrete fibers.

7. The method of claim 4 in which the resin is a solution of a formaldehyde-based resin with urea, melamine, resorcinol or phenol.

* * * * *